United States Patent
Ho

(10) Patent No.: US 8,380,058 B2
(45) Date of Patent: Feb. 19, 2013

(54) CAMERA AND ELECTRONIC DEVICE USING SAME

(75) Inventor: Hung-Lung Ho, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 75 days.

(21) Appl. No.: 13/167,718

(22) Filed: Jun. 24, 2011

(65) Prior Publication Data

US 2012/0195579 A1 Aug. 2, 2012

(30) Foreign Application Priority Data

Jan. 28, 2011 (TW) .............................. 100103204 A

(51) Int. Cl.
*G03B 17/00* (2006.01)
(52) U.S. Cl. ......................................................... 396/74
(58) Field of Classification Search .............. 396/73–75; 348/340, 360, 361; 359/821
See application file for complete search history.

(56) References Cited

U.S. PATENT DOCUMENTS

| 3,185,061 | A | * | 5/1965 | Westphalen | 396/74 |
| 4,266,855 | A | * | 5/1981 | Mohr | 359/821 |
| 5,687,031 | A | * | 11/1997 | Ishihara | 359/821 |
| 6,726,796 | B2 | * | 4/2004 | Wells et al. | 156/277 |
| 7,746,580 | B2 | * | 6/2010 | Chang | 359/819 |
| 8,072,532 | B2 | * | 12/2011 | Lin | 348/360 |
| 8,077,254 | B2 | * | 12/2011 | Yu | 348/360 |
| 2005/0101348 | A1 | * | 5/2005 | Wang | 455/556.1 |
| 2012/0195579 | A1 | * | 8/2012 | Ho | 396/74 |

* cited by examiner

*Primary Examiner* — W. B. Perkey
(74) *Attorney, Agent, or Firm* — Altis Law Group, Inc.

(57) ABSTRACT

An exemplary camera includes a lens module, a rotatable board, and a number of secondary lenses. The lens module is positioned on a substrate and defines an optical axis at the central axis thereof. The rotatable board is positioned above the lens module and rotatable to a number of discrete positions. The secondary lenses are located on the rotatable board. In each discrete position, one of the secondary lenses is optically aligned with the lens module.

18 Claims, 4 Drawing Sheets

_US 8,380,058 B2_

CAMERA AND ELECTRONIC DEVICE USING SAME

BACKGROUND

1. Technical Field

The present disclosure relates to image capturing devices, particularly to a camera and an electronic device employing the camera.

2. Description of Related Art

A typical camera employs a number of optical lenses movable along an optical axis. The optical axis may be a straight line or a line with a 90-degree bend, for appropriately implementing zoom operations. The movable optical lenses move along paths that are largely or mostly empty space. The requirement to preconfigure the space necessarily means that the volume occupied by the camera is rather large. In particular, when the camera is used in a compact electronic device such as a mobile phone, it may be very problematic to implement the camera.

Therefore, it is desirable to have a camera that can provide optimal compactness in electronic devices.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
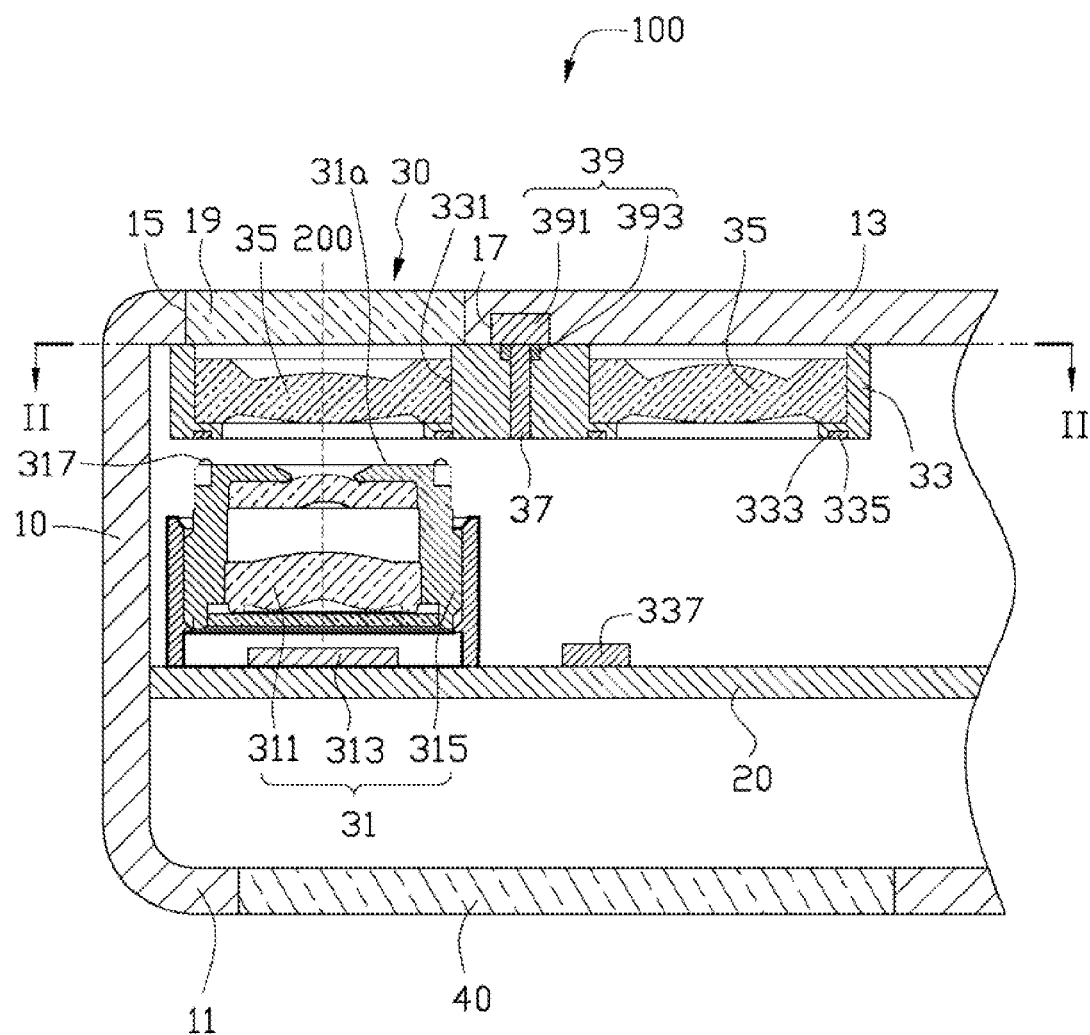
FIG. 1 is a cross-sectional view of part of an electronic device, according to a first exemplary embodiment.
Figure 2:
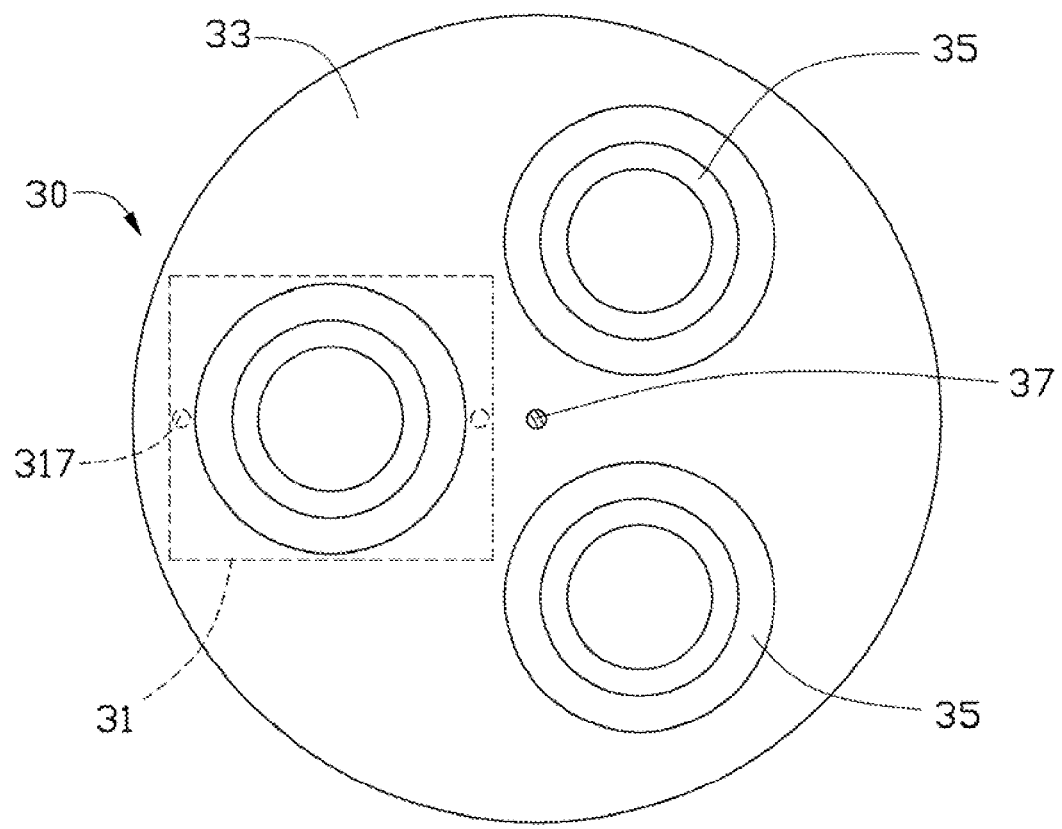
FIG. 2 is a top view of part of the electronic device shown in FIG. 1, corresponding to line II-II thereof.

FIG. 1 is a cross-sectional view of part of an electronic device 100, according to a first embodiment. The electronic device 100 includes a housing 10, a substrate 20 received in the housing 10, a camera 30 enclosed by the housing 10 and positioned on the substrate 20, and a display 40 located at a surface of the housing 10. The camera 30 captures images at a proper focal length according to a zooming operation (further details are provided below). The display 40 timely displays the images captured by the camera 30.

In the present embodiment, the electronic device 100 is a mobile phone. The substrate 20 is a motherboard of the electronic device 100.

The housing 10 includes a main portion 11 and a cover board 13. The main portion 11 is generally in the form of a tray. The cover board 13 substantially covers an open top of the main portion 11. The cover board 13 is parallel to the substrate 20, and defines a first through hole 15 opposite to the camera 30 and a blind hole 17 adjacent to the first through hole 15. A transparent board 19 is received in the first through hole 15, to transmit ambient light propagating to the camera 30. An opening of the blind hole 17 faces the substrate 20.

In the present embodiment, the first through hole 15 and the blind hole 17 are both circular. In different embodiments, the shapes of the first through hole 15 and/or the blind hole 17 can be triangular, rectangular, rhomboid or polygonal.

The camera 30 includes a lens module 31, a rotatable board 33, at least one secondary lens 35, and a rotatable shaft 37. In the present embodiment, there are three secondary lenses 35.

The lens module 31 is positioned on the substrate 20, and includes a group of lenses 311, an image sensor 313, and a lens holder 315 receiving the group of lenses 311. In the illustrated embodiment, the lens module 31 functions as a prime lens, and there are two lenses 311 in the group of lenses 311. A central axis of the group of lenses 311 forms an optical axis 200 of the lens module 31. The image sensor 313 is centered on the optical axis 200, and is electrically connected to the motherboard of the electronic device 100. The image sensor 313 can transform light transmitted from the group of lenses 311 into image signals, and transfer the image signals to the display 40. A top end of the lens holder 315 closest to the first through hole 15 has a light emitting plane 31a. Thus the light emitting plane 31a constitutes a part of the lens module 31. The light emitting plane 31a is substantially parallel to the cover board 13. Two transmitters 317 are positioned on the light emitting plane 31a. In the present embodiment, the transmitters 317 are configured for emitting infrared light signals, in directions perpendicular to the light emitting plane 31a and away from the substrate 20.

In other embodiments, each transmitter 317 is not limited to being an infrared type of transmitter. Other suitable types of transmitters known in the art can be used.

The rotatable board 33 is circular. The diameter of the rotatable board 33 is larger than the outer diameter of the lens module 31, and the rotatable board 33 can totally cover the lens module 31. The rotatable board 33 is spaced apart from the lens module 31, to avoid friction. In the present embodiment, the rotatable board 33 is made of opaque material. The rotatable board 33 defines three second through holes 331 equidistantly arranged on an imaginary circle which is centered at the center of the rotatable board 33. All the second through holes 331 have the same size, and are circular. Each second through hole 331 can be centered on the optical axis 200 of the lens module 31 when that second through hole 331 is positioned directly above the lens module 31. Two recesses 333 are symmetrically defined in a bottom side of the rotatable board 33 at opposite sides of each second through hole 331. Each recess 333 receives a corresponding receiver 335. Each receiver 335 thus corresponds to one of the transmitters 317 when the associated second through hole 331 is positioned directly above the lens module 31. The distance between the two receivers 335 at each second through hole 331 is equal to that between the transmitters 317. The receivers 335 are configured to receive signals transmitted from the transmitters 317.

In addition, the rotatable board 33 is positioned at an object side of the lens module 31, and is substantially parallel to the light emitting plane 31a. The rotatable board 33 can be rotated relative to the lens module 31. In one embodiment, the rotatable board 33 is positioned directly below the cover board 13 via the rotatable shaft 37.

The rotatable shaft 37 is substantially parallel to the optical axis 200 of the lens module 31. In the present embodiment, the rotatable shaft 37 is a cylinder. A main portion of the rotatable shaft 37 including a bottom end thereof is fixed to the rotatable board 33 by adhesive (e.g. glue) or using other suitable mechanical methods (see FIG. 1). Alternatively, the main portion of the rotatable shaft 37 can be integrally formed with the rotatable board 33. A top end of the rotatable shaft 37 is connected to a motor 39, which is positioned on the cover board 13 in the present embodiment. The motor 39 includes a stator 391 and a rotor 393. The stator 391 is received in the blind hole 17, and the rotor 393 is connected to the rotatable shaft 37. The rotor 393 thereby rotates the rotatable shaft 37 relative to the stator 391.

The secondary lenses 35 are correspondingly received in the second through holes 331. In the present embodiment, the lens module 31 includes three secondary lenses 35. The centers of the three secondary lenses 35 are arranged along the imaginary circle which is centered at the center of the rotatable board 33. A central axis of the rotatable shaft 37 runs through the center of the imaginary circle.

Furthermore, in the present embodiment, the electronic device 100 includes a controller 337 which is electrically connected to the motherboard of the electronic device 100. The controller 337 is in communication with the motor 39, to control the motor 39 to rotate the rotatable board 33 relative to the lens module 31. In detail, the controller 337 controls the rotor 393 to rotate the rotatable shaft 37 at a predetermined speed according to a manual operation of the electronic device 100 by a user, until certain of the receivers 335 receive signals output from the transmitters 317. For example, when the user presses a "start" button (or a "zoom in" button and a "zoom out" button, all not shown) which is provided on the housing 10 of the electronic device 100, the controller 337 receives the user's instruction and starts to control the rotor 393 to continuously rotate at the predetermined speed, for example, 150 degrees per second. The rotor 393 thus drives the rotatable board 33 to rotate relative to the lens module 31. In the present embodiment, the rotor 393 starts from a first position in which one of the secondary lenses 35 is coaxial with the optical axis of the lens module 31. When the rotatable board 33 rotates relative to the lens module 31, the secondary lenses 35 follow the rotation of the rotatable board 33. When the rotatable board 33 rotates to a position in which a center axis of another one of the secondary lenses 35 is coaxial with the optical axis 200 of the lens module 31, the corresponding receivers 335 are aligned with the transmitters 317 and can receive signals output from the transmitters 317.

The controller 337 is also electrically connected to the receivers 335. When the rotatable board 33 rotates to a proper position in which a desired one of the secondary lenses 35 is aligned with the lens module 31, the corresponding receivers 335 positioned above the lens module 31 receive signals transmitted from the transmitters 317 and instantaneously output corresponding signals to the controller 337. In this case, the controller 337 controls the rotatable shaft 37 to immediately stop rotating according to the signals output from the receivers 335, and maintain the rotatable board 33 in the proper position until a next user's instruction is input to the electronic device 100.

When the center axis of any one of the secondary lenses 35 is coaxial with the optical axis 200 of the lens module 31, the zoom ratio of the camera 30 is equal to a product of the zoom ratio of the lens module 31 and the zoom ratio of the secondary lens 35. For example, when the zoom ratio of the lens module 31 is designated to be B1, while the zoom ratio of a given one of the secondary lenses 35 is designated to be B2, then the zoom ratio of the camera 30 is defined as B=B1*B2. The three secondary lenses 35 in this embodiment have different zoom ratios, such as 2×, 3×, and 4×. Thus the camera 30 can obtain three different zoom ratios. That is, the zoom ratio of the camera 30 can be changed by optically combining different secondary lenses 35 with the lens module 31.

In addition, a proper (desired) zoom ratio can be determined by the user comparing different images displayed on the display 40. That is, the user can carry out the above-described zooming operation again and again until the user views a desired clear image on the display 40. At this point, the zoom ratio of the lens module 31 together with the zoom ratio of the corresponding secondary lens 35 are confirmed to be the proper zoom ratio of the camera 30, and the user presses the "shutter" button which is provided on the housing 10 of the electronic device 100.

In summary, when the camera 30 of the electronic device 100 is going to be used, the user points the camera 30 at an object that the user wants to photograph. Then the user views the image on the display 40, and decides whether it is the best image as far as the user is concerned. If the image on the display 40 is the best image, the user presses the "shutter" button on the housing 10 of the electronic device 100. If the image on the display 40 is not the best image, the user presses the "start" button, and waits for the camera 30 to carry out the zooming operation and achieve a focused image. It is understood that the waiting time may be only a split second. Then the user views the image on the display 40, and decides whether it is the best image as far as the user is concerned. If the image on the display 40 is the best image, the user presses the "shutter" button on the housing 10 of the electronic device 100. If the image on the display 40 is not the best image, the user presses the "start" button again, and waits for the camera 30 to carry out the zooming operation and achieve another focused image. The user repeats the above-described steps until the best image is achieved.

In alternative embodiments, there can be more than three second through holes 331, and correspondingly more than three secondary lenses 35. In other embodiments, there can be three second through holes 331, but with at least one of the second through holes 331 being maintained empty, i.e., with no secondary lens 35 installed therein. In the latter case, when there is no requirement to change the zoom ratio of the lens module 31, the empty second through hole 331 is rotated to be coaxial with the optical axis 200 of the lens module 31.

Figure 3:
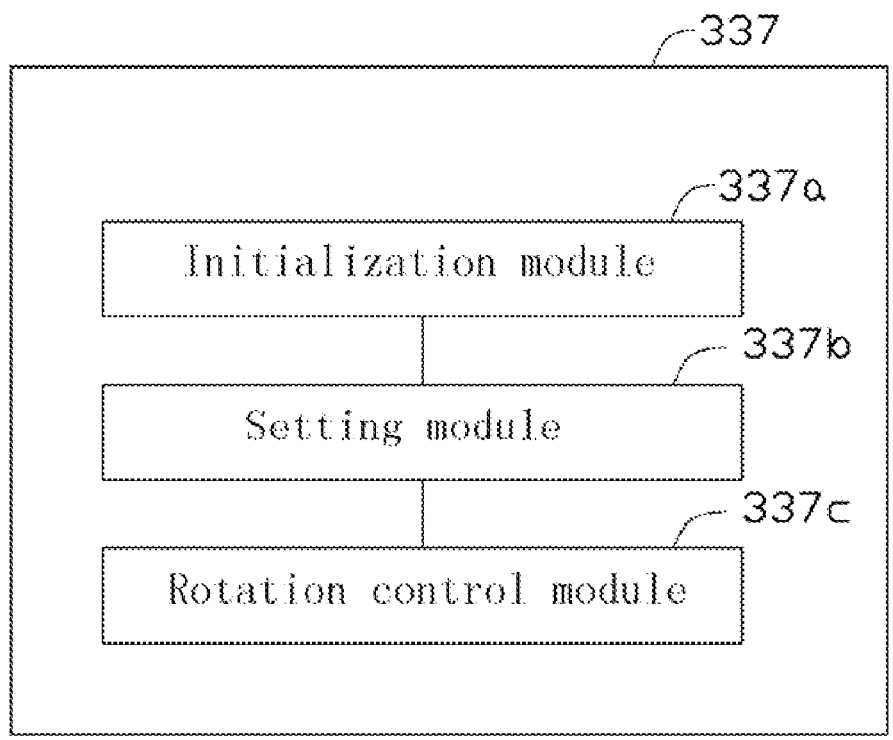
FIG. 3 is a functional block diagram of a controller of the electronic device of FIG. 1, according to an alternative embodiment.

Referring to FIG. 3, in an alternative embodiment, the transmitters 317, the recesses 333, and the receivers 335 can be omitted. Instead, the controller 337 includes an initialization module 337a, a setting module 337b, and a rotation control module 337c.

The initialization module 337a is configured to rotate the rotatable shaft 37 to a predetermined initial position in which a pre-designated one of the secondary lenses 35 is moved into alignment with the lens module 31. The camera 30 is thereby made ready for use. Subsequently, a "zoom in" instruction (pressing a "zoom in" button, not shown) or a "zoom out" instruction (pressing a "zoom out" button, not shown) can be input by a user.

The setting module 337b is configured to preset a predetermined angle, by which the rotatable board 33 can rotate so that the center axis of a next available secondary lens 35 is coaxial with the optical axis 200 of the lens module 31. The predetermined angle can for example be a clockwise (e.g. "positive") angle of 120° from the initial position, corresponding to (e.g.) the user pressing the "zoom in" button on the housing 10 of the electronic device 100; or a counterclockwise (e.g. "negative") angle of 120° from the initial position, corresponding to (e.g.) the user pressing the "zoom out" button on the housing 10 of the electronic device 100.

The rotation control module 337c is configured to rotate the rotatable board 33 according to the predetermined angle, and thus the center axis of the corresponding next available secondary lens 35 can be coaxial with the optical axis 200 of the lens module 31.

Before the zooming process, the controller 337 initializes the position of the rotor 393a via the initialization module 337a. That is, the controller 337 controls the rotatable shaft 37 to rotate to the predetermined initial position. Then during the zooming process, the controller 337 controls the rotor 393 to rotate the rotatable shaft 37 according to the predetermined angle instructed by the user, so that the center axis of the corresponding next available secondary lens 35 is coaxial with the optical axis 200 of the lens module 31. With the controller 337 configured in this way, the elements needed for the camera 30 are reduced.

When the camera 30 of the electronic device 100 is going to be used, the user points the camera 30 at an object that the user wants to photograph. The user presses an "initialize" button (or a "zoom" button, both not shown), and waits for the camera 30 to reach the predetermined position and achieve a focused image. It is understood that the waiting time may be only a split second. Then the user views the image on the display 40, and decides whether it is the best image as far as the user is concerned. If the image on the display 40 is the best image, the user presses the "shutter" button on the housing 10 of the electronic device 100. If the image on the display 40 is not the best image, the user presses either the "zoom in" button or the "zoom out" button, and waits for the camera 30 to carry out the zooming operation and achieve another focused image. The user repeats the above-described steps until the best image is achieved.

Figure 4:
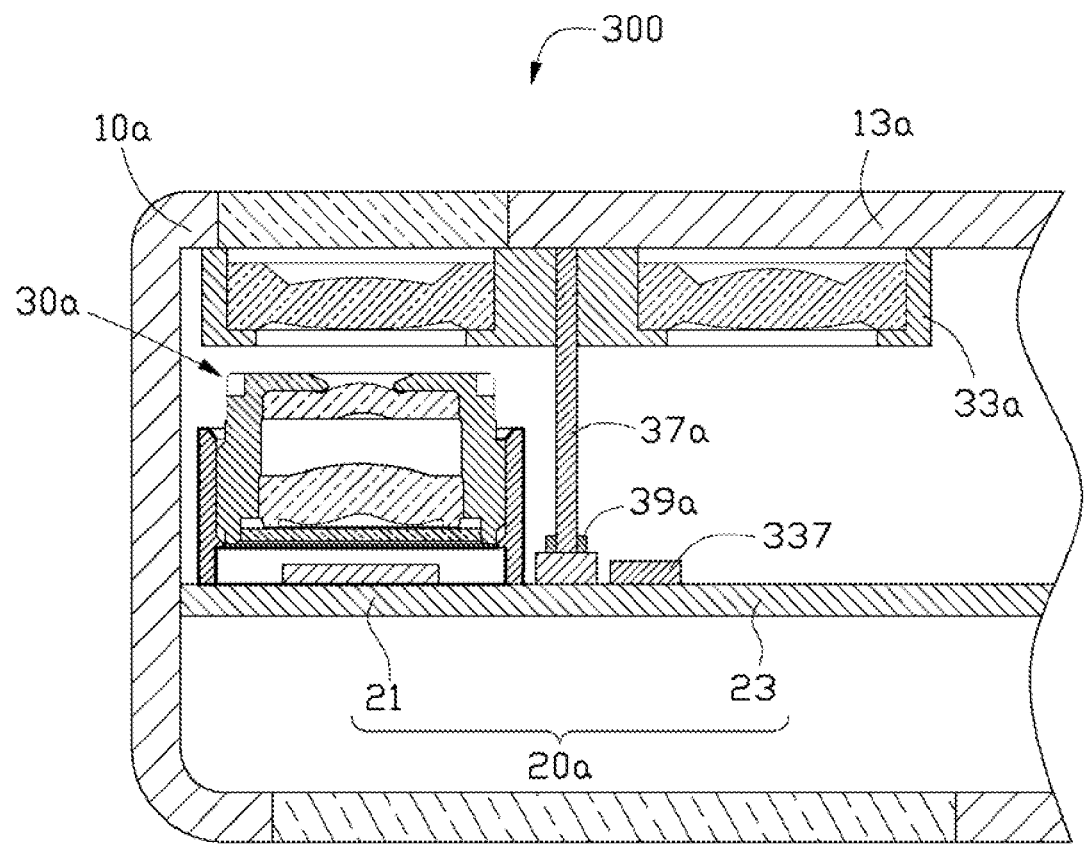
FIG. 4 is a cross-sectional view of part of an electronic device, according to a second exemplary embodiment.

Referring to FIG. 4, an electronic device 300 according to a second embodiment is provided. A camera 30a of a second embodiment is similar to the camera 30 of the first embodiment. A rotatable board 33a is positioned on a cover board 13a, while a motor 39a is positioned on a substrate 20a which is parallel to the cover board 13a. A rotatable shaft 37a is located between the rotatable board 33a and the substrate 20a. In the second embodiment, the substrate 20a includes a first portion 21, and a second portion 23 located on a same plane with the first portion 21. A lens module 31a is fixed on the first portion 21, while the rotatable board 33a is connected to the second portion 23 by the rotatable shaft 37a. The motor 39a is fixed on the second portion 23 and is connected to a bottom end of the rotatable shaft 37a. Thus the rotatable shaft 37a can rotate the rotatable board 33a relative to the substrate 20a. As such, there is no blind hole in the cover board 13a. In the second embodiment, the controller 337 includes the above-described initialization module 337a, setting module 337b, and rotation control module 337c. The controller 337 can function in much the same way as is described above in relation to the electronic device 100 of the first embodiment.

It will be understood that the disclosed embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A camera comprising:
a lens module positioned on a substrate and defining an optical axis;
a rotatable shaft capable of rotating relative to the substrate;
a rotatable board connected to the rotatable shaft and rotatable in unison with rotation of the rotatable shaft; and
at least one secondary lens located on the rotatable board and rotatable in unison with rotation of the rotatable board, wherein when the rotatable board is rotated to a position in which a center axis of one of the at least one secondary lens is aligned with the optical axis of the lens module, a zoom ratio $\beta$ of the camera satisfies the following formula: $\beta=\beta_1 * \beta_2$, wherein, $\beta_1$ is a zoom ratio of the lens module, and $\beta_2$ is a zoom ratio of the one of the at least one secondary lens.

2. The camera of claim 1, wherein the rotatable shaft is positioned on a cover board parallel to the substrate, the cover board defines a first through hole generally opposite to the lens module and a blind hole adjacent to the first through hole, a transparent board is received in the first through hole, the opening of the blind hole faces the substrate.

3. The camera of claim 2, wherein the lens module has a light emitting plane which is substantially parallel to the cover board, two transmitters are positioned on the light emitting plane away from the substrate and configured for transmitting signals.

4. The camera of claim 3, wherein the rotatable board defines a plurality of second through holes equidistantly arranged on an imaginary circle which is centered at the center of the rotatable board and the optical axis, the at least one secondary lens comprises a plurality of secondary lenses, and the secondary lenses are correspondingly received in the second through holes.

5. The camera of claim 4, wherein two recesses are symmetrically defined on a bottom side of the rotatable board beside each second through hole, and two receivers are received in the two recesses and configured to receive signals transmitted from the transmitters.

6. The camera of claim 5, wherein there are three second through holes, with at least one of the second through holes being maintained empty, when there is no requirement to change the zoom ratio $\beta_1$ of the camera, the center axis of the empty second through hole is rotated to be coaxial with the optical axis of the lens module.

7. The camera of claim 5, wherein the distance between each two receivers is equal to that between the transmitters.

8. The camera of claim 2, wherein the rotatable shaft is connected to a motor which is positioned on the cover board, the motor comprises a stator and a rotor, the stator is received in the blind hole, and the rotor is connected to the rotatable shaft, the rotor rotates the rotatable shaft relative to the stator.

9. The camera of claim 8, wherein the rotatable board is positioned on the cover board while the motor is positioned on the substrate, the rotatable shaft is located between the rotatable board and the substrate, the substrate comprises a first portion and a second portion located on a same plane with the first portion, the lens module is fixed on the first portion, while the rotatable board is connected to the second portion by the rotatable shaft, the motor is fixed on the second portion and connected to an end of the rotatable shaft, to further rotates the rotatable board relative to the substrate.

10. The camera of claim 1, wherein the rotatable board is circular, the diameter of the rotatable board is larger than the outer diameter of the lens module.

11. The camera of claim 1, wherein the rotatable board is made of opaque material.

12. The camera of claim 1, wherein the rotatable board is positioned at an object side of the lens module and is substantially parallel to the substrate.

13. An electronic device comprising:
a housing comprising a cover board;
a substrate received in the housing and oriented substantially parallel to the cover board;
a camera enclosed by the housing, the camera comprising:
a lens module positioned on the substrate and defining an optical axis;
a rotatable shaft associated with one of the cover board and the substrate, and rotatable relative to the substrate and the cover board;

a rotatable board connected to the rotatable shaft and rotatable in unison with rotation of the rotatable shaft; and at least one secondary lens located on the rotatable board, wherein when the rotatable board is rotated to a position in which a center axis of one of the at least one secondary lens is aligned with the optical axis of the lens module, a zoom ratio β of the camera satisfies the following formula: $\beta=\beta 1*\beta 2$, wherein, β1 is a zoom ratio of the lens module, and β2 is a zoom ratio of the one of the at least one secondary lens; and a display located on the housing and configured to display images captured by the camera.

14. The electronic device of claim 13, wherein the at least one secondary lens comprises a plurality of secondary lenses, and a desired final zoom ratio β is confirmed by the user comparing different images displayed on the display.

15. The electronic device of claim 13, wherein two transmitters are positioned on the lens module, away from the substrate and configured for transmitting signals, and two receivers corresponding to the transmitters are positioned on the rotatable board, configured to receive signals transmitted from the transmitters.

16. The electronic device of claim 15, further comprising a controller electrically connected to the substrate, wherein the controller controls the rotatable shaft to rotate in a predetermined speed according to a manual operation by a user, until certain of the receivers receive signals output from the transmitters.

17. The electronic device of claim 15, further comprising a controller electrically connected to the substrate, wherein the at least one secondary lens comprises a plurality of secondary lenses, and the controller comprises:

an initialization module configured to rotate the rotatable shaft to a predetermined position in which a pre-designated one of the secondary lenses is moved into alignment with the lens module before a control instruction is input by a user;

a setting module configured to preset a predetermined angle by which the rotatable board can rotate so that the center axis of another one of the secondary lenses is coaxial with the optical axis of the lens module; and a rotation control module configured to rotate the rotatable board according to the predetermined angle such that the center axis of the another one of the secondary lenses is coaxial with the optical axis of the lens module.

18. The electronic device of claim 17, wherein the rotatable shaft is connected to a motor, which is positioned on the cover board, the motor comprises a stator and a rotor, the stator is positioned on the cover board, and the rotor is connected to the rotatable shaft, the rotor rotates the rotatable shaft relative to the stator, the motor is electrically connected to a controller, the controller controls the rotor to rotate the rotatable shaft at the predetermined angle.

* * * * *